2,978,393

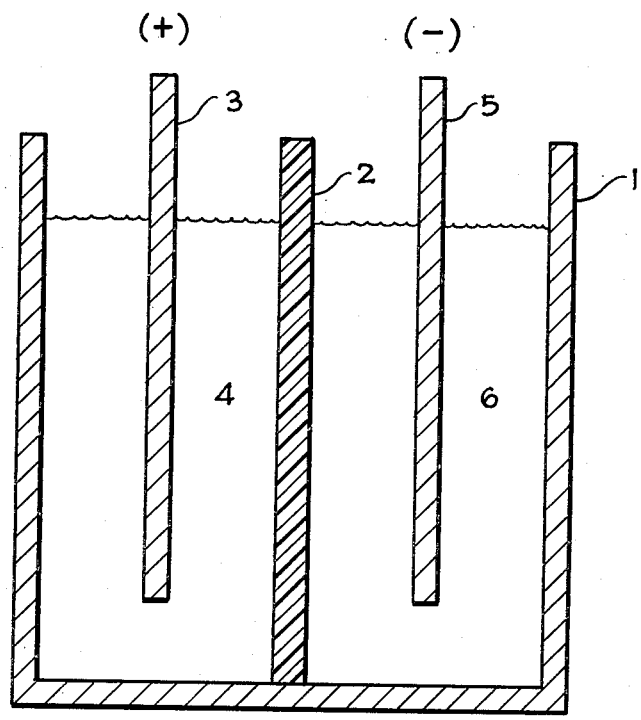

ELASTOMERIC PERMSELECTIVE MEMBRANES

Paul E. Hoch, Niagara Falls, and Paul Robitschek, Buffalo, N.Y., assignors to The Hooker Chemical Corporation, Niagara Falls, N.Y., a corporation of New York Original application Apr. 16, 1956, Ser. No. 578,173. Divided and this application Nov. 5, 1959, Ser. No. 12,887

20 Claims. (Cl. 204—98)

This invention relates to new permselective membranes and to processes for producing them. More particularly this invention relates to new elastomeric permselective membranes exhibiting chemical, electrical, electro-chemical, ion-exchange, permselective, physical, and mechanical properties of such nature as to render them suited for use in industrial processes.

This is a division of the parent application Serial Number 578,173, filed April 16, 1956.

The use of granulated ion-exhange resins to remove various ions from a solution has been known to the art for some time. More recently, a new use for ion-exchange resins was developed and is becoming increasingly more important. In this new use the ion exchange resin is fabricated into the form of a sheet or pellicle. It was found that this sheet selectively allows certain ions to pass through while preventing the passage of other types of ions. In effect, the sheet acts as an ionic sieve. This property is called permselectivity.

Many uses have been found for permselective membranes. One use is the purification of sea water by removing the salts therefrom. Another use is the concentration of dilute spent pickling acids, waste salts, and alkalis which result as by-products of chemical processes. Still another use is the demineralization of proteins. Another use is the separation of ions such as amphoteric ones from non-amphoteric ones, and certain ions from others having different mobility or electron charges. Another use which has become most important is the decomposition of ionic solutions by electrolysis where it is desired to maintain the decomposition products separate from one another. An important example is the electrolysis of sodium chloride solution where it is desired to keep the sodium hydroxide which is produced separate from the reactant sodium chloride. Another example is the production of substantially pure carbonates during electrolysis by introducing carbon dioxide into caustic solutions which are maintained substantially free of chloride ions.

A number of permselective membranes for the purposes set out above have been disclosed in the prior art. Some workers have used sulfonated phenolic resins. Phenolic resins, however, have been found to be insufficient to withstand the rigors of electrolysis in the presence of caustic soda and chlorine.

Most of the attempts in the art to provide permselective membranes suitable for use in electrolysis have been made with ion-exchange resins in their commercially available form. There the resin is generally in the form of beads, and is so prepared that it has the maximum number of ion-exchange groups per unit weight of resin. This is necessary to give the resin a high ion-exchange capacity. In the case of a permselective membrane, however, it is not necessary that the membrane contain the greatest possible concentration of ion-exchange groups. Only sufficient groups are needed to provide the necessary conductivity and ionic transfer. Consequently, the concentration of the ion-exchange groups may be somewhat reduced in order to provide increased structural strength. To improve the structural strength and to limit the number of functional groups within the membrane it has been the practice of the prior art generally to produce what is called a heterogeneous membrane, that is, one wherein clumps or beads of ion-exchange resin are scattered throughout an inert resinous membrane. This tends to increase the strength of the membrane somewhat, but has had an unfavorable effect upon the other properties, since it is virtually impossible by this method to provide a sufficiently uniform dissemination of ion-exchange groups throughout the membrane. This method results in a membrane which has areas of high ion-exchange group concentration surrounded by other areas containing no ion-exchange groups whatever. As a result, when the membranes are immersed in the electrolytic solution, the high concentration areas absorb a large amount of water while the low concentration areas absorb none. This results in severe strains and stresses being produced within the membrane and eventually in the membrane's rupture and subsequent failure. Another disadvantage is that the conductivity of a membrane of this type is unsatisfactorily low. Because of these limitations the heterogeneous type of membrane has not enjoyed wide commercial acceptance.

With respect to the homogeneous membranes, that is, membranes wherein the individual ion-exchange groups are uniformly distributed throughout the membrane, the results obtained in the art to date have here also proved successful only for limited applications. These membranes have been mainly comprised of phenolic resins containing substituted sulfonic acid groups. They have been unable to withstand the rigors of many electrolytic processes because of the inherent inability of phenolic resins to withstand chemical attack. In addition, these resins, according to their proponents, must be produced with a certain amount of water or liquid solvents present at all stages of the process, thus greatly increasing the difficulties and cost of production.

It is an object of this invention to provide a new cation permselective membrane. It is also an object to provide such membranes which have good conductivity. It is a further object of this invention to provide such membranes which have excellent mechanical properties rendering them suitable for industrial operations, especially where the membrane is subject to attack by corrosive reactants and products. It is still a further object of this invention to provide such permselective membranes which will contain the ion-exchange groups uniformly distributed throughout the membrane and which are chemically combined with the resin molecules. It is also an object of this invention to provide a permselective membrane which may be fabricated substantially free from water and from liquid solvents and maintained so until just prior to its use. It is a further object to provide a permselective membrane which is elastomeric rather than hard and brittle. Still further objects will become apparent to those skilled in the art on further consideration of the disclosure made hereinafter.

It has now been found that homogeneous permselective membranes containing these desired properties for use in industrial electrolytic applications may be produced by vulcanizing, in the presence of a vulcanizing agent, a dry composition selected from the group consisting of: (A) a blended mixture comprised of (1) an addition polymer containing groups which may be hydrolyzed to form carboxyl groups, and (2) a polymer which is free of potentially active ion-exchange groups; (B) a blended mixture comprised of (1) an addition polymer containing carboxyl groups, and (2) an olefinically unsaturated monomer free of potentially active ion-exchange groups; (C) a polymerized composition produced by polymerizing a mixture of monomers comprised of (1) a mixture of an olefinic monomer containing a group which may be subsequently hydrolyzed to form a carboxyl group and an olefinic carboxylic compound, and (2) an olefinic monomer free from potentially active ion-exchange groups; and (D) a polymerized composition produced by polymerizing a mixture of monomers comprised of (1) an olefinic carboxylic compound and (2) an olefinic monomer free of potentially active ion-exchange groups. The dry elastomeric membrane thus produced is free from water or any liquid solvent and is then treated in a hydrolyzing medium such as aqueous sodium hydroxide until the potentially active ion-exchange groups have been converted into carboxyl groups or their salts. It has been found that the membranes produced according to this invention have inherently good physical properties, high efficiency in selectively transferring ions, and good conductivity. The membranes thus formed comprise an elastomeric addition polymer containing active ion-exchange groups homogeneously distributed throughout the membranes so that the strength of the membranes is not adversely affected.

As used in the paragraph above and throughout the specification and claims, the terms have the following meanings: "carboxyl groups" include the groups in acid form containing hydrogen, in the anhydride form, and in the salt form where the hydrogen is replaced by a metal. The term "groups which may be subsequently hydrolyzed to form carboxyl groups" comprises such groups as esters, amides, and chlorides of a carboxylic acid, and nitrile groups, all of which upon treatment with the proper hydrolyzing medium may be converted into carboxylic acids or salts thereof. The term "free from potentially active ion-exchange groups" means that there is no group attached to the compound which upon treatment in any manner such as by hydrolysis will form a group which would act as an ion-exchange group. The term "potentially active ion-exchange groups" includes esters, amides, or acid chlorides of carboxylic acids, nitrile groups, carboxylic acid and anhydride groups, or any other group which may be treated such as by hydrolysis to form carboxyl ion-exchange groups or which have ion-exchange properties. The term "carboxylic compound" includes the acid, acid anhydride, acid chloride and acid salt. Also as used in the specification and claims the term "membrane" includes "sheet" or "pellicle." The terms "free from liquid solvents" means free from solvents such as water, toluene, benzene, diethyl benzene, alcohols such as dioxane, halogenated hydrocarbons such as heptane, and, in general, any liquid which will dissolve in the resinous mixture but will not polymerize therewith.

Reference is made to the figure which is given to illustrate a preferred use of our invention in the electrolysis of chemical compounds, but is not to be construed as limiting, except as defined in the appended claims. A container 1 is divided by the permselective diaphragm 2 of our invention into an anode compartment containing an anode 3 in contact with the anolyte 4, and a cathode compartment containing a cathode 5 in contact with the catholyte 6.

The membranes of the present invention are of two different types and are prepared by two different general methods. In the first method, a polymer containing carboxyl groups or groups which may be subsequently hydrolyzed to form carboxyl groups, such as polyethylacrylate rubber, is blended together with another polymer which does not contain potentially active ion-exchange groups, that is, groups which may be subsequently hydrolyzed to form ion-exchange groups. An example of this latter polymer is polybutadiene or GRS, which is a copolymer of butadiene and styrene. These materials may be compounded on any type of rubber rolls or other equipment generally used in the rubber art for compounding rubbers. To the mixture of the above polymers is then added the usual rubber additives and a vulcanizing agent such as sulfur. The mixture is then worked into the form of a thin sheet suitable for use as a permselective membrane and vulcanized at normal vulcanizing temperatures. After vulcanizing the membrane is placed in a hydrolysis medium in order to convert the potential ion-exchange groups to carboxyl groups or to the salts thereof. The membrane is then ready for use.

In the method described above, the first component which contains the potentially active functional group is introduced into the mixture to be blended and subsequently vulcanized in the form of an addition polymer. Among the compositions which may be used for this component are the polymerized esters of acrylic acid such as polymethylacrylate, polyethylacrylate, and polymerized esters of methacrylic acid such as methyl and ethyl methacrylates. In addition copolymers of various olefinically unsaturated acids, anhydrides and esters copolymerized with butadiene may be used. Among them are methyl fumarate-butadiene copolymer, ethyl fumarate-butadiene copolymer, copolymers of butadiene with fumaric acid, maleic acid, copolymers of esters and half-esters of fumaric and maleic acid with butadiene may also be used. Polymers containing other groups which may be subsequently hydrolyzed to produce carboxylic groups are the nitriles such as acrylonitrile, and vinylidene cyanide. The amides of carboxylic acids such as acrylic and methacrylic acid may also be used. In addition the carboxylic acid chlorides may be used.

The second component of the blend type copolymer is the diluent. This component should preferably be a polymer composed of at least one monomer which contains at least two olefinic groups. The diluent component serves to reduce the ion-exchange functional group capacity and to increase the strength of the membrane. Among the compounds which can be used as the diluent component are polymeric butadiene, copolymers of butadiene and styrene such as GRS, copolymers of butadiene and chlorinated styrenes, chloroprene, piperylene, and other polymerized aliphatic dienes and substituted dienes such as the halogenated butadienes. The dienes may also be used as copolymers with vinyl chloride and vinylidene chloride. In addition copolymers of dienes such as butadiene with halogenated olefins such as dichlorodifluoroethylene, tetrafluoroethylene and chlorotrifluoroethylene may be used. Monofunctional polymers such as polyisobutylene and copolymers of chlorotrifluoroethylene and chlorosulfonated polyethylene may in some instances be used.

For many purposes it may be desirable to strengthen the membrane by the incorporation of a filler into the blend prior to vulcanization. Among such fillers are carbon black, silica, magnesia, clays, zinc oxide, glass cloth, asbestos, polyvinyl chloride, blends of polyvinyl chloride and vinylidene chloride, polystyrene, polydichlorodifluoroethylene, polychlorotrifluoroethylene, Teflon, etc. The addition of these fillers tends to make the membrane stronger and more resistant to chemical attack. The amounts used are not critical and any amounts generally used in the rubber art may be used.

The vulcanizing agent used may be any of the common ones used for the vulcanization of rubbers. Among them are sulfur, peroxides such as dicumyl peroxide, hydroperoxides such as cumene hydroperoxide, Durez 12687 which is a condensation product of Cardanol, phenol, and formaldehyde, and many others known to the art. The vulcanizing agents may be used in any amount commonly used in the rubber art.

The second method of practising the present invention is to admix the various components in a form of their monomers, copolymerize the mixture, and subsequently vulcanize the resulting copolymer after it has been molded into the desired form. There are a number of types of polymerizable monomers which may be used as the active ion-exchange-group-containing component. The first type is the group comprising esters of olefinic carboxylic acids. Among them are methyl acrylate, ethyl acrylate, 2-ethylhexyl acrylate, the esters of methacrylic acid, and the esters and half-esters of maleic and fumaric acid, such as methyl and ethyl maleates. Another type is the one comprising the unsaturated acids and anhydrides themselves, such as acrylic and methacrylic acid, maleic acid and anhydride, fumaric acid, itaconic acid and anhydride, cinnamic acid and anhydride, vinyl benzoic acid and its anhydride, crotonic and isocrotonic acid and their anhydrides, butanoic acid, luconic acid, alpha hydrocinnamic acid, aconitic acid, chloromaleic acid and its anhydride, ethyl maleic acid and its anhydride, etc. Another type of compound comprises the nitriles of which acrylonitrile is an example. In addition the amides and acid chlorides of the above named acids and anhydrides may be used. Also, vinylidene cyanide, methacrylonitrile, and the half-esters of fumaric and maleic acid may be used.

When the second method of practising the present invention is used, a sensitizing material should be added to the monomeric mixture prior to polymerization in order to facilitate the subsequent hydrolysis of the respective functional groups to carboxyl groups. The sensitizing agent may be an olefinic organic acid or anhydride. Suitable sensitizing agents may be selected from the group consisting of acrylic acid, methacrylic acid, fumaric acid, maleic acid, maleic anhydride, citraconic anhydride, aconitic anhydride, itaconic anhydride, and mixtures thereof. An amount of at least about one percent by weight may be used. However, when the functional monomer already contains carboxyl groups, such as, for example when acrylic acid or maleic anhydride are used as the functional monomer, an additional sensitizing acid need not be added.

The diluent component of the second form of practising the invention is also added in the form of its monomer. Among the monomers which maye be used are butadiene, mixtures of butadiene and styrene, mixtures of butadiene with vinylidene or vinyl chloride monomers, and other aliphatic olefins.

After the various components in the form of monomers have been mixed together, a polymerization catalyst is added and the mixture is polymerized to the solid state. The emulsion polymerization method is generally preferred. Any of the common polymerization catalysts, and especially the emulsion polymerization catalysts may be used. Among them are potassium, sodium and ammonium persulfate, peroxides such as benzoyl peroxide and dicumyl peroxide, and hydroperoxides such as cumyl hydroperoxide. Redox systems such as peroxides in conjunction with metallic reducing agents such as iron salts, or in conjunction with sugars may also be used. Additionally, compounds such as azobisbutyronitrile may be used. The catalysts may be used in any amount generally disclosed in the prior art. As little as less than one-tenth of one percent based on the weight of the copolymer may be employed successfully. There is no critical upper limit. However, little may be gained by exceeding three percent. The preferred range is from about one to about one and one-half percent by weight based on the total polymer.

In order to add certain properties such as mechanical strength or resistance to chemical action, any of the fillers mentioned above in connection with the first method may be added prior to vulcanization.

The copolymer formed above is then placed on preheated rubber rolls and blended together with a vulcanizing agent such as sulfur, various accelerators, fillers, and other ingredients common to the rubber trade. After blending it is sheeted and vulcanized under the usual vulcanizing conditions.

The dry vulcanized membranes prepared by the methods described above are solid sheet-like elastomeric membranes which are substantially free from water or other liquid solvents and must then be treated in a hydrolyzing medium prior to use as a membrane. This treatment has two important functions. First it introduces water of hydration into the membrane and allows it to become electrically conducting. Second it hydrolyzes the potentially active functional groups such as the carboxylic esters, amides, chlorides, and the nitrile groups to carboxyl groups or salts thereof. This renders these groups capable of acting as ion-exchange groups. It is generally preferred that the hydrolyzing medium be an aqueous solution of a strong base such as sodium or potassium hydroxide. In some cases, however, strong acid solutions may be used, although they may necessitate a longer treatment. The concentrations of the hydrolyzing media are not critical but should generally be at least 5 percent by weight of the alkali or acid based on the weight of solution. The time of treatment varies depending upon the membrane composition. It may vary from several hours to as much as several days. The preferred temperature is from about 85 to 100 degrees centigrade, although lower temperatures may be used. Subsequent to the hydrolysis treatment the membrane may be placed in the cell in which it is to function. However, in order to condition it, the membrane may, subsequent to hydrolysis and prior to use in a cell, be treated in a solution which contains the same ions at approximately the same activities as that of the solution in the electrolytic cell in which the membrane is subsequently to function.

The functional group component of the present invention is important primarily because it furnishes the ion-exchange groups which render the membrane permselective and electrically conductive. The ion-exchange functional group capacity, measured by the milliequivalents of ion-exchange groups per gram of dry resin, is also an important factor in the determination of the strength properties of the membrane, as well as its electrical conductivity. The higher the functional group capacity, the greater will be the water content and swelling pressure of the membrane during and after hydrolysis when measured at any given external electrolytic concentration. For instance when the milliequivalent capacity per gram is over 6.0, the polymerized, vulcanized, and hydrolyzed membrane has generally lower structural strength. As this value of milliequivalent capacity per gram becomes lower, the hydrolyzed membrane becomes more rigid. The operative range of functional group capacity is between about 1.0 and 6.0 milliequivalents of ion-exchange groups per gram of dry polymerized resin. The preferred range is between about 2.5 and 3.0 milliequivalents.

The diluent component also has an important function in the permselective membrane. First, it serves to decrease the ion-exchange functional group concentration and thereby decrease the swelling stress produced within the membrane when it is hydrolyzed and during the time it is operating in contact with the ionic solution. As the diluent content increases, the structural rigidity, inertness, and strength of the membrane also increase. The only limiting consideration of the inert diluent contents is that as the diluent content is increased, the conductivity of the membrane decreases proportionately. Thus, the diluent content cannot be increased beyond the point where the conductivity falls below the useful level. The preferred range of the diluent is between about 50 and 85 mole percent, although a range of 25 percent to 90 percent may be used in some cases. When it is greater than 85 mole percent the resistance of the membrane becomes too high, as there is then not a sufficiently high concentration of ion-exchange groups.

The amount of filler used is not critical and in general may be employed in proportions approximating those commonly used in the rubber art.

The relative amounts of vulcanizing agent and other rubber additives are likewise not critical and values commonly employed in the rubber art may be used.

The thickness of the membranes made by this invention are not critical. The thickness desired will depend upon the desired use. In general, suitable membranes may be from less than one-sixteenth inch to as much as one inch thick. A thicker membrane will have a longer useful life. However, the resistance of the membrane increases proportionally to its thickness and the value will be obtained above which the resistance is too great for practical use.

The permselective membranes of this invention have many advantages over those of the prior art. First, the copolymer formed is of such a composition that it is very effective in resisting the corrosive action of the extremely reactive products used and produced, and will stand up under the severe conditions encountered in a commercial electrolytic application. In this respect it is far superior to the traditional phenolic resin ion-exchange membranes.

Second, because the active ion-exchange groups are spread uniformly throughout the membrane and are not concentrated in localized areas which are in turn surrounded by inert polymer areas, as in the case of the membranes composed of ion-exchange beads suspended in inert polymeric sheets, they are physically stronger and less subject to cracking when in contact with the electrolyzing solution. During the hydrolysis and during electrolysis the ion-exchange groups become highly hydrated. When the ion-exchange groups are uniformly distributed throughout the membrane, the internal stress produced is not unduly severe. However, when a high ion-exchange group concentration area such as an ion-exchange bead becomes hydrated, severe stress is produced and the membranes become highly susceptible to cracking.

Third, because in the membranes of the present invention the ion-exchange groups are uniformly distributed and are not separated by large masses of inert polymer, as in the case of the membranes made from ion-exchange beads, their conductivities are higher than the membranes of the prior art, using the so called heterogeneous membranes. Table I below gives a comparison of the conductivities of the membranes of the present invention with those of some heterogeneous membranes of the art.

TABLE I

| Diaphragm | Specific Conductivity (mhos/cm.) |
| --- | --- |
| Amberplex C-1 | $1.06 \times 10^{-3}$ |
| Permutit cation diaphragm No. 743 | $0.38 \times 10^{-3}$ |
| Diaphragm of Example 2 below | $15 \times 10^{-3}$ |

For all the conductivity measurements of the above, a $\frac{1}{10}$ M sodium chloride solution was used. Amberplex C-1 is a membrane composed of ion-exchange beads which are the polymerization product of sulfonated styrene and divinylbenzene imbedded in a polyethylene sheet, the proportions being 50 parts polyethylene sheet to 150 parts of a mixture of 95 percent of sulfonated styrene and 5 percent divinylbenzene. Permutit cationic diaphragm No. 747 is a mixture of 25 grams methacrylic acid and 1 gram divinylbenzene, also imbedded in an inert sheet of polyethylene. Since the membranes of the present invention are more conductive than either of those shown above, they may be used in greater thickness as a result of which they will have a much longer useful life. In addition, because of their greater conductivity a saving in cost of electrical current will result.

In addition to the above, there are many advantages associated with the use of the present permselective membranes by virtue of their being elastomeric membranes. First, they may be molded using simple molding techniques. Second, they are better able to withstand the swelling pressures encountered during hydrolysis and subsequent use in an electrolytic cell. Finally, various reinforcing fillers or screens may be more readily added during the compounding for the purpose of reinforcing the finished membrane.

The following examples will serve to illustrate the present invention and the improvements resulting therefrom. Throughout the examples, for the sake of expediency, a number of trade names and proprietary named materials have been referred to. Following is a listing of the formulations of the various materials so used:

PA-21—Commercial polyethyl acrylate-alpha-chlorovinyl ether rubber
Rotax—Mercapto benzothiozole
Methyl tuads—Tetramethylthiuramdisulfide
Duponal ME—Fatty alcohol sulfates
Daxad 11—Polymerized mixture of alkylaryl sulfonic acids
Dow 529K—80% styrene, 20% butadiene copolymer
GRS 2000—Butadiene-styrene rubber containing 44 to 48% styrene
Dow 512K—60% styrene, 40% butadiene copolymer
Kralac AP—85% styrene, 15% butadiene copolymer
Hycar 2007—80% styrene, 20% butadiene copolymer
Dicup-40-C—Dicumylperoxide (40%)-calcium carbonate
Armeen-18—$C_{18}H_{35}N(CH_3)_2$ The following examples illustrate the preparation of an elastomeric cationic permselective membrane by the vulcanization of a compounded blend of several polymers, as described by the first method above. In every case below the one membrane two compartment cell described below was used for testing purposes.

EXAMPLE 1

Forty grams of a commercially available polyethylacrylate rubber designated PA-21 was placed on a rubber mill maintained at 150 degrees Fahrenheit. This material was banded slowly. After banding for a short period 60 grams of Dow 529K was slowly added to the banded polyacrylate rubber. After thorough banding and mixing on the mill, the following ingredients were added: 2 grams of stearic acid, 2 grams of zinc oxide, ½ gram of a Rotax, one gram of methyl tuad, 30 grams of carbon black, 1 gram of triethylenetetramine and 2 grams of sulfur. These materials were blended thoroughly. The amine and sulfur were added at a lowered mill temperature of 120 degrees Fahrenheit. After thorough mixing the material was stripped from the mill and was ready for vulcanization. A piece of this material was placed in a flash mold at 167 degrees centigrade for one and one-half to two hours. The cured rubber at this point was then submitted to hydrolysis in hot 13 to 17 percent caustic for six days. At this point the electrical conductivity of the membrane had attained a sufficiently high value. The membrane was then tested by the methods described below, and gave excellent results.

EXAMPLE 2

To a preheated (150° F.) roller mill was added 75.0 grams PA-21 rubber gum. After breakdown and bonding had taken place, 25.0 grams GRS-2000 rubber was added. These materials were thoroughly mixed. To this bonded material 50 grams of carbon black was added slowly. After mixing 1.0 gram of stearic acid was added. To the mix was then added 0.5 gram Rotax, 1.0 gram methyl tuad and 2.0 gram sulfur. Finally 1.0 gram triethylenetetramine was slowly added. The batch was mixed, stripped from the mill several times and repassed through the mill. A tacky sheet was obtained.

A sheet of the crude rubber from the mill, as prepared above, was cut and placed in a square flask mold lined with cellophane. This cold mold was placed in a press preheated to 160 degrees centigrade. Pressure was raised slowly to close the mold (during 5 minutes) and the pressure adjusted to above 20,000 pounds platen pressure. The temperature of 160–165 degrees centigrade and the pressure were maintained for forty minutes. The mold was then cooled and the rubber removed.

A sheet of the cured rubber described above was placed at 90–95 degrees centigrade in 17 percent potassium hydroxide for five days. The rubber was now considerably swollen. A piece of this material exhibited a current efficiency of 66 percent in the test cell, and permselectivities of greater than 90 percent. This material was now suitable for use as a permselective membrane.

EXAMPLE 3

The membrane produced above in Example 2 was placed in a two compartment test cell in order to test its usefulness in producing chlorine and caustic soda. The test cell contained two compartments which were separated from each other by the membrane produced above. Sodium chloride brine was fed continuously at approximately 25.5 percent sodium chloride and was depleted to approximately 22 to 23 percent sodium chloride. Water was added continuously to the cathode compartment to maintain a concentration of approximately 25 to 40 grams per liter sodium hydroxide. The anode consisted of a graphite block and the cathode of a steel screen. The membrane was spaced from the anode by a one-fourth inch thick soft rubber gasket. The cathode screen was placed in contact with the diaphragm and spaced one-half inch from the steel back plate of the cell. The active area of the diaphragm was 7.9 square inches. The voltage was adjusted to pass a 5 ampere current through the cell, or a current density of 91 amperes per square foot of membrane. Chlorine was continuously produced at the anode, hydrogen at the cathode, and substantially pure sodium hydroxide in the cathode compartment. The membrane exhibited high current efficiency and long useful life.

Table II below shows examples of elastomeric permselective membranes made according to the processes described in Examples 1 and 2 and tested as described in Example 3. Various blends were utilized in varying proportions as set out in the table. The properties of the membranes are also set out, and were determined by the methods described in Examples 25, 26, and 27 below. In every example, the following traditional rubber additives were admixed as described in Examples 1 and 2 above. Two grams sulfur, 2 grams zinc oxide, 0.5 gram Rotax, one gram methyl tuad, 2 grams stearic acid, and 2 grams triethylenetetramine.

centigrade. After two hours without a change in the reflux temperature, 0.07 gram more catalyst was added. After four hours an additional 0.07 gram of ammonium persulfate was added. The reflux temperature rose slowly to 89 degrees centigrade and then refluxing stopped. The emulsion was subjected to a steam distillation to remove unused monomer. The latex was coagulated by the addition of the latex to a two percent solution of potassium alum. The rubber obtained was elastic, somewhat weak, and slightly tacky. It was dried at 50 degrees centigrade overnight in an oven through which a current of air was passed.

Eighty grams of the crude dry rubber prepared above was placed on a milling machine, the rollers of which were warmed to 90–100 degrees Fahrenheit. To the rubber was added 26.4 grams carbon black and 0.9 gram stearic acid. After thorough mixing 0.9 gram Rotax and 1.8 grams of sulfur were added. Finally 1.8 grams of triethylenetetramine was slowly added. The material was now much stiffer than the original rubber. It was placed in a preheated mold (160° C.) lined with cellophane. The mold was placed in a press heated to 160 degrees centigrade. The mold was slowly closed by applying pressure. The pressure was raised to above 30,000 pounds platen pressure and held at a temperature of 160 degrees centigrade for one and one-fourth hours. The mold was cooled and the rubbed removed. A well molded, smooth sheet was obtained, which was very tough and pliable.

A piece of the rubber prepared above was cut to a weight of 18.4 grams. It was placed in 20 percent caustic solution maintained at 90–95 degrees centigrade for about three days. At the end of that period the membrane exhibited good permselective properties.

EXAMPLE 13

A heavy walled crowned top soda bottle was charged with 160 grams water, 3 grams Duponal ME, 1 gram Daxad 11, 12 grams ethyl acrylate, 8 grams acrylic acid and 48 grams styrene. The bottle was chilled to zero degrees centigrade. Into this bottle was then introduced 12 grams of butadiene. An excess of butadiene (over 12 grams) was actually added and this excess was permitted to boil off, thus displacing the air in the bottle.

TABLE II

| Example Number | Functional Component, Grams | | Diluting Component, Grams | | Filler, Grams | | Permselectivity, Percent | Current Efficiency, Percent | Life |
|---|---|---|---|---|---|---|---|---|---|
| Example 4 | PA-21 | 100 | | | Carbon black | 20 | 83 | 55 | 9 hrs. |
| Example 5 | PA-21 | 75 | GRS-2000 | 25 | do | 20 | 68.6 | 60 | 2 days. |
| Example 6 | PA-21 | 40 | GRS-2000 | 60 | do | 30 | 75 | 81 | 11 days. |
| Example 7 | PA-21 | 40 | Dow 529-K | 60 | do | 30 | 81.6 | 66 | 43 days. |
| Example 8 | PA-21 | 40 | Dow 512-K | 60 | do | 30 | 95.1 | 81.8 | 12 days. |
| Example 9 | PA-21 | 40 | Kralac-AP | 60 | do | 30 | 72 | 55 | 41 days. |
| Example 10 | PA-21 | 40 | Hycar 2007 | 60 | None | | 72.2 | 63 | 21 days. |
| Example 11 | PA-21 | 40 | {50% butadiene, 50% dichlorodifluoroethylene} | 60 | Carbon black | 30 | 61 | 60 | 11 days. |

The following examples illustrate the preparation of elastomeric permselective membranes according to the present invention by the polymerization of a mixture of monomers and the subsequent vulcanization of the copolymer so formed. This method has been described in the specification above as the second method.

EXAMPLE 12

A 2-liter three necked indented flask equipped with a paddle stirrer, condenser, and a nitrogen inlet tube was charged with 500 cc. of water and 4.0 grams of Duponal ME. After stirring several minutes 180 grams ethyl acrylate, 10 grams 2-chlorovinylethyl ether and 10 grams methacrylic acid were added. The emulsion was warmed to 70 degrees centigrade and 0.03 gram of ammonium persulfate was added. Refluxing began at 81 degrees The bottle was capped immediately and then placed in a water bath at 40 to 45 degrees centigrade and rotated at approximately 30 r.p.m. end over end for 19 hours. The bottle was cooled externally with ice and salt then opened. The emulsion was subjected to a steam distillation to remove unreacted monomer, and then emptied into cups and placed in a —20 degree centigrade freezer in order to coagulate the polymer. A granular crystalline powder was obtained. This powder was washed thoroughly with water and dried at 50 degrees centigrade. The weight of solid obtained was 77 grams or about 97 percent of theory.

Fifty grams of the powder obtained above was placed on the rolls of a rubber mill which had been preheated to 140–160 degrees Fahrenheit. The material was banded and then the following compounding ingredients were added slowly:

1.0 gram stearic acid
1.0 gram zinc oxide
0.25 gram Rotax
0.5 gram methyl tuad
1.0 gram sulfur The material was milled thoroughly and then stripped from the mill. The resin thus prepared was prewarmed on the mill and sheeted. A piece of this sheet was cut and placed in a steel flash mold lined with cellophane. The flash mold was placed in a hydraulic press and the pressure slowly increased to close the mold. The temperature of the plates was 160–165 degrees centigrade which temperature was maintained for the one and one-half hours required for the cure. The elastomer was now pliable.

The above sheet of cured elastomer was placed in hot (90° C.) 13 percent aqueous potassium hydroxide solution for 3–4 days. It picked up approximately 35 percent water during this time. It was found to conduct current well in a small electrolytic cell and showed a current efficiency of 70–80 percent for generating caustic and a permselectivity of 71 percent with a life of over 40 days in operation.

Table III below shows examples of elastomeric permselective membranes which were prepared according to the method described above in Example 13. The various ingredients and actual amount of each used are shown, together with the data obtained from tests made according to the procedures described below in Examples 25, 26 and 27. In each example the following traditional rubber compounding ingredients were admixed prior to vulcanization based on 100 grams of dry polymer: 2 grams sulfur, 2 grams zinc oxide, 0.5 gram Rotax, 1 gram methyl tuad, and 2 grams stearic acid.

percent neutralized with hydrochloric acid); 56 grams butadiene; 20 grams ethyl acrylate; and 40 grams methacrylic acid (distilled). The polymerization was carried out in the same manner as Example 13 above. The temperature varied from 38–50 degrees centigrade, and the polymerization time was 16–20 hours.

The emulsion obtained was steam distilled to remove unreacted monomers. The emulsion was coagulated by freezing or by adding saturated brine containing 4 percent sulfuric acid. The white rubber-like crumbs of material were oven dried and weighed 66 grams or approximately 84 percent of theory. The rubber obtained was milled, compounded and cured as summarized in Table IV below. The dry membranes were then treated with hot caustic as described in Example 13 until a constant weight was obtained. These ion permselective membranes were then tested electrically. The results obtained are tabulated in Table IV.

TABLE IV

| Example No. | g./100 g. Rubber Curing System | Fillers, g./100 g. Rubber | Permselectivity | Current Efficiency, Percent | Life, Days |
|---|---|---|---|---|---|
| Example 22 | Dicup, 40° C., 5 grams | Carbon black, 60 | 96.8 | 76 | 14 |
| Example 23 | Sulfur, 2.0 grams | Carbon black, 30 | | 67 | 14 |

The following examples demonstrate the methods by which the various properties of the membranes of the present invention were determined.

EXAMPLE 24

For the purpose of determining the relative number of equivalents of hydrolyzable groups in the membranes, the following procedure was followed:

The molded sheet of a dry polymeric ion-exchange membrane, approximately 3 by 4 inches in size, was laid on the bottom of a four liter beaker and two hundred cc. of standard 20 percent sodium hydroxide was piped into the beaker. After covering with a watch glass, the beaker was heated on a steam bath until hydrolysis was complete, this process requiring from one to four days or more, depending on the type of membrane used. During this period the level of the liquid in the beaker was maintained approximately at the starting level by

TABLE III

*Elastomeric copolymers*

| Example No. | Functional Monomer | Diluent Monomer | Sensitizing Monomer | Vulcanizing Agent | Filler | Permselectivity, Percent | Current Efficiency, Percent | Life |
|---|---|---|---|---|---|---|---|---|
| Example 14 | Acrylic acid, 12 grams; methacrylic acid, 5.8 grams; 17.8 grams. | Butadiene, 36.8 grams. | | Dicup–40–C, 5 grams/100 grams rubber. | Carbon black 30 grams/100. | >90 | 86 | >6 days. Brine failed. |
| Example 15 | ___do___ | ___do___ | | Sulfur, 2 grams/100 grams rubber. | ___do___ | >90 | 83 | Do. |
| Example 16 | Ethyl acrylate, 15.6 grams. | Butadiene, 44 grams. | Methacrylic acid, 3.1 grams. | Dicup 40–C, 5 grams/100. | Teflon, 6 grams/100. | 88 | 84 | 24 days. |
| Example 17 | ___do___ | ___do___ | ___do___ | ___do___ | Kralac AP, 8.3 grams/100. | >80 | 73 | 17 days. |
| Example 18 | ___do___ | ___do___ | ___do___ | ___do___ | Carbon black, 30 grams/100. | >88 | 89 | >50 days. |
| Example 19 | ___do___ | ___do___ | ___do___ | ___do___ | 60 grams/100 | >80 | 72 | 14 days. |
| Example 20 | Ethyl acrylate, 13 grams. | Butadiene, 13 grams; styrene, 52 grams. | Acrylic acid, 9 grams. | Sulfur, 2 grams/100. | None | 83 | 85 | 25 days. |

EXAMPLE 21

A heavy walled crowned cap bottle as described in Example 12 was charged with 160 grams distilled water; 0.16 gram aluminum chloride; 0.16 gram potassium persulfate and 0.33 gram of mixed tertiary mercaptans (Phillips Petroleum Co.), 4.0 grams Armeen-18 (90 the addition of distilled water. At the end of the heating period the aqueous solution was carefully poured into a 1 liter volumetric flask using distilled water to wash in all traces of the caustic solution. The hydrolyzed membrane was then washed successively with 50 cc. of distilled water, 250 cc. portions of 10 percent brine, and again with 50 cc. of distilled water. The washing was done by swirling the wash liquid around the membrane in the bottom of the beaker for a ten minute period. Each successive wash was added to the volumetric flask in the manner described above. After the transfer of all the washes the volume of the liquid in the volumetric flask was adjusted to the mark with distilled water, the flask shaken to insure thorough mixing and a 25 cc. sample of the resulting solution titrated with 0.1 N sulfuric acid using methyl orange as the indicator. The total amount of caustic utilized during the hydrolysis was then calculated and this amount related to the number of equivalents of hydrolyzable groups available in a membrane.

EXAMPLE 25

Current efficiency was determined in the following manner: the hydrolyzed membrane was placed in a two compartment cell. Twenty-two percent brine solution was continuously added to the anode compartment, and water was added to the cathode compartment at a rate sufficient to permit the generation of about three percent caustic soda. The total amount of charge was measured by an ampere-hour meter. The catholyte overflow liquor was collected and the amount of caustic produced within the period of time analyzed. The theoretical amount of equivalents of caustic soda was determined from calculation of the amount of electrical charge which had passed during the measurement period. The current efficiency was then obtained by dividing the equivalents of caustic soda analyzed by the amount that should theoretically have been formed by the amount of electricity passed and multiplying this quotient by 100. The following is the calculation used:

$$\text{Equiv passed theory} = \frac{\text{Total ampere hours}}{\frac{96,500}{3,600}}$$

= equiv. caustic theory $$CE = \frac{\text{Caustic equivalents by analysis}}{\text{Caustic equivalents by theory}} \times 100$$

EXAMPLE 26

The membrane life test was performed as follows. The membrane was placed in a two compartment 5 ampere cell. Brine was allowed to flow into the anode compartment and water into the cathode compartment. The water flow was adjusted to generate three percent caustic in the catholyte. Failures in the membrane were detected by periodically testing the catholyte exhaust for high chloride content with silver nitrate solution.

EXAMPLE 27

The permselectivity of the ion-exchange membranes was determined as follows.

Permselectivity may be defined mathematically as follows:

(1) $\text{Permselectivity} = \dfrac{t_{\text{mobile ion}} - t^\circ_{\text{mobile ion}}}{1 - t^\circ_{\text{mobile ion}}}$ where:

$t_{\text{mobile ion}}$ = transference number of the mobile ion in the membrane.

$t^\circ_{\text{mobile ion}}$ = transference number of the mobile ion in free solution. Values for transference numbers are obtained from the literature for the particular electrolyte and the concentrations used.

(2) Mathematically $$t_{\text{mobile ion}} = \frac{E + Eo}{2Eo}$$

$E$ = measured potential.

(3) $Eo = (t_+ - t_-)\left(\dfrac{RT}{F}\right) \ln \dfrac{a_2 \pm}{a_1 \pm}$ where:

$t_+$ = transference number of the positive ion
$t_-$ = transference number of the negative ion
$R$ = gas constant
$T$ = absolute temperature
$F$ = 96,500 coulombs (Faraday)
$a_1$, $a_2$ = molal activities of the electrolytes on each side of the membrane The procedure for determination was as follows: the wet preconditioned membrane was clamped in a two-compartment cell. Into each compartment were continuously passed dilute sodium chloride solutions. The concentration of the solutions was accurately known and the one solution had about twice the salt concentration of the other. The concentrations were on the order of 0.1 N–0.01 N in most if the determinations. The potential developed across the membrane by this cell (E) was measured (using silver-silver chloride standard electrodes, one immersed in each compartment in series with the membranes) by a very sensitive potentiometer.

The value of $Eo$ in the Equation 3 above was readily calculated from the known value of the salt concentration (from which the activities $a_1 \pm a_2$ were easily calculated using literature values for the activity coefficients). The transference numbers $t_+$, $t_-$ were readily available in the literature from the known activities of the ions.

With E and Eo known the value of $t_{\text{(mobile ion)}}$ in Equation 2 above was readily calculated. Then from Equation 1 the permselectivity of the membrane was dedetermined.

EXAMPLE 28

The membranes of the present invention may be placed in a three compartment electrolytic cell and used for the production of potassium hydroxide and potassium carbonate. This cell comprises an anode compartment which contains a graphite anode and which was separated from the center compartment by a cationic permselective diaphragm of this invention, and a cathode compartment which contained a steel cathode and which was separated from a center compartment by a similar cationic permselective membrane. This cell is disclosed in copending application "Method and Apparatus for Electrolysis," Serial No. 327,182, filed December 22, 1952, now abandoned, by Sidney G. Osborne and George T. Miller. Here the anode compartment contains a 25 percent potassium chloride solution which is separated from a center compartment by a permselective membrane. The center compartment contains 20 percent potassium carbonate. A similar membrane is used to separate the center compartment from the cathode compartment. The cathode compartment contains a 40 percent potassium hydroxide solution. When the current is applied through the electrodes of the cell, chloride ions are discharged at the anode with the production of chlorine, while the potassium ions are attracted toward the cathode with the production of hydrogen and potassium hydroxide. The cationic ion-exchange membranes act as a negatively charged screen and allows the passage of the positively charged potassium ion into the cathode compartment by a series of transfers along the carboxylic acid groups incorporated in the membrane. The reverse passage of negative ions from the anode or cathode compartments is prevented by the negatively charged carboxylic acid groups which tend to repel the anion. Hydrogen ions are discharged at the cathode with the production of hydrogen gas, while at the same time the migration of the potassium ions into the cathode compartment results in the production of potassium hydroxide in the compartment. During the operation of the cell the brine concentration in the anode compartment is maintained at the saturation point by passing the exit brine through a bed of potassium chloride before the recirculating back through the anode compartment. The caustic potash produced in the center compartment is periodically converted to potassium carbonate by circulating the solution from the compartment through a carbonating tower, where the caustic carbonate is neutralized with carbon dioxide gas. Part of this circulating carbonate solution is continually removed as an end product. The concentration of the potassium hydroxide in the cathode compartment is maintained close to the saturation point by the continual removal of the part of the solution from the cathode compartment as a product. A current density of 90 amperes per square foot is maintained with respect to the diaphragms, requiring a voltage of about 4.6 volts. At the end of the process very pure potassium hydroxide and potassium carbonate are obtained in good yield.

The economical operation of this cell is dependent upon the efficiency of the two ion-exchange membranes in separating the cell into three compartments. If these "ion sieves" are operating at high efficiency, hydroxyl ions are prevented from migrating into the anode compartment under the influence of the electric field. This results in a high cell current efficiency and in the production of chlorine which is free from oxygen. Another function of the permselective membranes is to prevent the diffusion of chloride ions from the anode compartment into the center and cathode compartments. Prevention of this diffusion results in the production of very pure grades of potassium carbonate and potassium hydroxide, which are substantially free from chloride ions.

The cation permselective diaphragms of the present invention may also be used to electrolyze organic salts such as sodium acetate to produce acetic acid. This process is also carried out in a three-compartment cell and is disclosed in copending application Serial No. 346,365, filed April 2, 1953, now Patent No. 2,967,806, by Sidney G. Osborne and George T. Miller. Here two cation permselective membranes separate a center compartment from both the anode compartment and the cathode compartment. The salt such as sodium formate or sodium oxalate is placed in a center compartment and upon the application of electrical current, the cations migrate to the cathode compartment and the acid remains in the center compartment.

It has been additionally found that the principles of the present invention may also be utilized to prepare novel anion permselective membranes. This results in an elastomeric type diaphragm which is composed of an elastomeric copolymer and which copolymer contains anion exchange groups attached thereto and uniformly distributed therein, rendering the membrane anionically permselective. The following example describes the production of such a membrane.

EXAMPLE 29

Into an eight ounce heavy-walled glass soda bottle was placed 180 grams distilled water, 5.0 grams Dresinate 731, which is a rosin soap, 25 grams 2-methyl-5-vinyl pyridine, 0.3 gram mixed tertiary mercaptans, and 0.3 gram potassium persulfate. The bottle was cooled externally with ice and salt until the internal temperature was approximately zero degrees centigrade. The bottle was then charged with 80 grams of 1,3-butadiene. The excess butadiene was permitted to boil away to displace the air in the bottle and the bottle was then capped mechanically using a metal crown-cap with a neoprene gasket. The bottle and contents were rotated in a constant water bath and heated at 45 to 48 degrees centigrade for 20 hours. The white emulsion obtained was treated with 0.2 gram of hydroquinone and 2.0 grams of phenylnaphthylamine. The emulsion was subjected to steam distillation to remove any remaining unreacted monomer. The rubber was then coagulated by the addition of five percent sodium chloride solution. At this point the rubber was a white tacky solid. This polymer was then placed on a rubber mill and mixed together with 2 percent sulfur, 0.5 percent Rotax, one percent methyl tuads, one percent stearic acid, and 2 percent zinc oxide. The compounded rubber was then placed in a flash mold and vulcanized at normal vulcanizing temperatures. The membrane thus molded was placed in a 20 percent sulfuric acid solution maintained at 95 degrees centigrade. The membrane was maintained in the solution until it had swelled about 80 percent in volume and had absorbed enough water to allow the passage of electric currents. In this form it was then suitable for use as an anionic permselective membrane.

The anionic permselective membrane produced above in Example 29 may be used in electrolytic cells either alone or in conjunction with a cationic permselective membrane of this invention for a large number of uses. One such use is described in copending application Serial No. 267,846, filed January 23, 1952, now Patent No. 2,967,807, by Sidney G. Osborne and George T. Miller, which discloses the electrolysis of sodium sulfate solution in a three compartment electrolytic cell. In this cell the salt is introduced into the center compartment which is separated by the cathode compartment by cation permselective membranes and which is separated from the anode compartment by an anion permselective membrane. A graphite anode and a steel cathode are used and a current applied to the electrodes. The operation of this cell by the application of an electric current results in the production of sulfuric acid in the center compartment.

Another use of the anion permselective membrane in conjunction with the cation permselective membranes of this invention is the de-ionization of sea water. The method for so doing is widely described in literature and in particular, U.S. Patent No. 2,694,680 which discloses a method of using a plurality of anion and cation permselective membranes arranged alternately to transfer electrolytes from one solution to another and thus effect a removal of ions from the material which it is desired to purify. As stated therein, this method may be used to remove electrolytic impurities from solutions of non-electrolytes, remove salts from glycerine by-products of soap manufacture, and demineralize sea water to render it fit for human consumption.

We claim:

1. A process for the production of a solid vulcanized resinous homogeneous elastomeric permselective membrane, which consists essentially of dry blending a mixture consisting essentially of (A) an ion-exchange-active material selected from the group consisting of (1) a vulcanizable addition polymer containing groups which may be hydrolyzed to form carboxyl groups, (2) a vulcanizable addition polymer containing carboxyl groups, (3) mixtures of (1) and (2), and (4) a vulcanizable addition polymer containing anion-exchange groups, and (B) an ion-exchange-inactive polymeric diluent; vulcanizing the blended composition with a vulcanizing agent to produce a dry homogeneous elastomeric membrane; and subsequently converting the potentially active functional groups to ion-exchange groups and introducing water of hydration into the membrane by hydrolyzing said dry vulcanized elastomeric membrane in an aqueous solution containing a hydrolysis catalyst to the extent necessary to produce ion-exchange groups uniformly distributed throughout said membrane in an amount from about one to about six milliequivalents per gram of dry membrane.

2. A permselective membrane formed in accordance with the process of claim 1.

3. An anion permselective membrane according to claim 2 wherein said blended mixture consists essentially of a vulcanizable vinyl pyridine polymer and a vulcanizable butadiene polymer.

4. A process for the production of a solid vulcanized resinous homogeneous elastomeric cationic permselective membrane which consists essentially of dry blending a mixture consisting essentially of (A) an ion-exchange-active material selected from the group consisting of (1) a vulcanizable addition polymer containing groups which may be hydrolyzed to form carboxyl groups, (2) a vulcanizable addition polymer containing carboxyl groups, and (3) mixtures of (1) and (2), and (B) a vulcanizable ion-exchange-inactive polymeric diluent; vulcanizing the resulting blended composition with a vulcanizing agent to produce a dry homogeneous elastomeric membrane; and subsequently converting the potentially active functional groups to carboxyl groups and introducing water of hydration into the membrane by hydrolyzing said dry vulcanized elastomeric membrane in an aqueous solution containing a hydrolysis catalyst to the extent necessary to produce carboxyl groups uniformly distributed throughout said membrane in an amount from about one to about six milliequivalents per gram of dry membrane.

5. A process according to claim 4 wherein said blended mixture consists essentially of a vulcanizable polymerized olefinic carboxylic compound and a vulcanizable polymerized conjugated diolefin.

6. A process according to claim 4 wherein said blended mixture consisting essentially of a vulcanizable polymerized polyacrylate and a vulcanizable polymerized diolefin.

7. A process according to claim 6 wherein said blended mixture consists essentially of a vulcanizable polymerized polyacrylate and a vulcanizable polymerized conjugated diolefin.

8. A process according to claim 7 wherein said blended mixture consists essentially of a vulcanizable polyacrylate and vulcanizable polybutadiene.

9. A process according to claim 4 wherein said blended mixture consists essentially of a vulcanizable copolymer of a polyacrylate with an olefin and a vulcanizable polymerized conjugated diolefin.

10. A process according to claim 4 wherein said blended mixture consists essentially of a vulcanizable polymerized acrylonitrile and a vulcanizable polymerized diolefin.

11. A permselective membrane formed in accordance with the process of claim 4.

12. A process for the production of a solid vulcanized resinous homogeneous elastomeric permselective membrane which consists essentially of dry blending a mixture consisting essentially of (A) an ion-exchange-active material selected from the group consisting of (1) a vulcanizable addition polymer produced by polymerizing an olefinic monomer selected from the group consisting of carboxylic acids, carboxylic anhydrides, carboxylic esters, carboxylic amides, carboxylic chlorides, nitriles, and mixtures thereof, and (2) a vulcanizable addition polymer containing an anion-exchange group, and (B) a vulcanizable ion-exchange-inactive polymeric diluent; said ion-exchange active material being present in said membrane in an amount between about ten percent and about seventy-five percent of the vulcanized materials, the remaining polymeric composition being ion-exchange in-active diluent; vulcanizing the resulting composition with a vulcanizing agent to produce a dry homogeneous elastomeric membrane; and subsequently converting the potentially active functional groups to ion-exchange groups and introducing water of hydration into the membrane by hydrolyzing said dry vulcanized elastomeric membrane in an aqueous solution to the extent necessary to produce ion-exchange groups uniformly distributed throughout said membrane in an amount from about one to about six milliequivalents per gram of dry membrane.

13. The membrane formed in accordance with the process of claim 12.

14. The membrane formed in accordance with the process of claim 12 containing water of hydration in an amount at least about twenty percent by weight of said dry vulcanized composition.

15. The permselective membrane formed in accordance with the process of claim 12 wherein the ion-exchange-active material is present in an amount between about fifteen percent and about fifty percent by weight of the dry vulcanized material.

16. A permselective membrane formed in accordance with the process of claim 12 where the ion-exchange-groups are present in an amount from about 2.5 to about three milliequivalents per gram of dry membrane.

17. A permselective membrane according to claim 13 wherein said blended mixture consists essentially of a vulcanizable polymerized olefinic carboxylic compound and a vulcanizable polymerized conjugated diolefin.

18. A cell for the electrolytic decomposition of an alkali metal halide which consists essentially of a container, an anode, a cathode, which contains interposed between said anode and said cathode a permselective membrane made in accordance with the process of claim 1.

19. The method of producting the electrolytic decomposition of chemical components which comprises interposing a solid homogeneous permselective membrane between electrodes in an electrolyte cell, said membrane having been made in accordance with the process of claim 1; maintaining said membrane wet with electrolyte; impressing a decomposition voltage across said electrodes and recovering the decomposition products of electrolysis so produced.

20. A method according to claim 19 wherein said membrane is a blended mixture consisting essentially of a vulcanizable polymerized acrylonitrile and a vulcanizable polymerized diolefin.

References Cited in the file of this patent

UNITED STATES PATENTS

| | | |
|---|---|---|
| 2,419,202 | D'Alelio | Apr. 22, 1947 |
| 2,684,352 | Fisk | July 20, 1954 |
| 2,698,313 | Daly | Dec. 28, 1954 |